Figure 1:
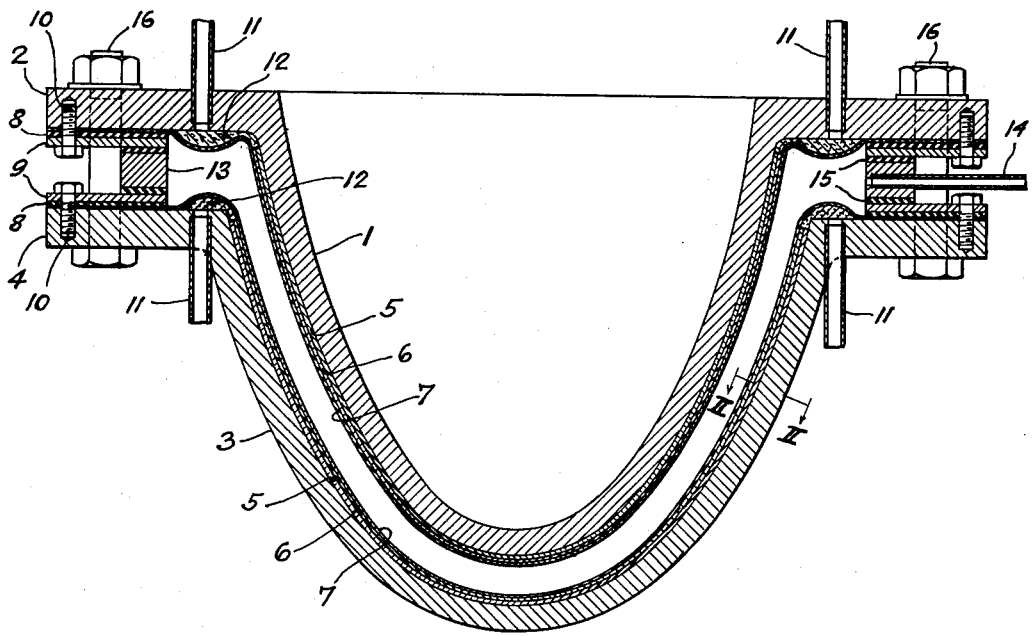

Nov. 8, 1955   W. J. HAMPSHIRE ET AL   2,722,962
APPARATUS FOR MAKING VOID-FREE FABRIC LAMINATES
Filed Dec. 4, 1951

INVENTORS
William J. Hampshire
James C. Coomes
& Roy A. Motz
BY
ATTORNEY

United States Patent Office 2,722,962
Patented Nov. 8, 1955

2,722,962

APPARATUS FOR MAKING VOID-FREE FABRIC LAMINATES

William J. Hampshire, Cuyahoga Falls, James C. Coomes, Suffield, and Roy A. Motz, Greentown, Ohio, assignors to Goodyear Aircraft Corporation, Akron, Ohio, a corporation of Delaware Application December 4, 1951, Serial No. 259,816

2 Claims. (Cl. 154—1)

The invention relates to the making of multicurved laminates of layers of resin-impregnated fabric of any suitable material, either woven, non woven or unoriented mat, and in particular to apparatus for making such laminates void-free or air-free.

Heretofore, it was the practice in vacuum bag molding for producing multicurved laminated articles made of resin-impregnated fibrous material to evacuate the bag, with the laminate therein, in order to eliminate from the laminate excessive resin and the air. However, in so doing, the air could not be completely removed and, therefore, the strength and durability of the laminate did not come up to requirements. Complete air removal, however, was achieved by applying mechanical means to supplement evacuation, as disclosed in the patent application of Wilson C. McDonald et al., for Method of Making Air-Free Fabric Laminates, Serial No. 39,858, filed July 21, 1948.

It is the object of this invention to provide apparatus obtaining complete air removal by the provision of an eventually discarded surface bleeder cover on top of the laminate containing a minimum of resin to remove the air and excessive resin in the laminate by the shortest possible way when the bag is evacuated and moderate pressure is applied to the outside of the vacuum bag.

Another object of the invention is the simultaneous use of spaced apart male and female molds nested together, after a laminate, provided with a dry cloth cover, has been placed on each one of the molds and to evacuate and pressurize both laminates simultaneously to remove excessive resin and all air from the laminate.

The aforesaid objects of the invention and other objects which will become apparent as the description proceeds, are achieved by using a male and female mold forming, in assembled condition, a pressure chamber. Before assembling the molds, each separate mold has formed thereon a laminate consisting of resin-impregnated layers of fabric containing a minimum of resin. Upon each laminate is put a dry bleeder cloth which in turn is covered with a vacuum bag sealed to its respective mold, whereupon both bags are simultaneously evacuated. Thereafter, the molds, with the laminates facing each other, are nested with proper spacing between them, and sealed all around, to receive moderate air pressure for a period of time until all air and excessive resin has been bled or drained from the laminates through the dry bleeder cloth and through bleeder rings. Following this procedure, heat at a temperature up to about 150° F. is then slowly admitted for about 30 to 45 minutes and by increasing the temperature to about 180° F. to 200° F. and holding it for about 2 hours the laminates are cured. After removal of the laminates from the molds, the bleeder cloth is stripped from the laminates. If desired the molds can then be reassembled and the space left between the laminates may be filled with foaming material to unite both laminates into an article provided with a foamed-in core.

Figure 2:
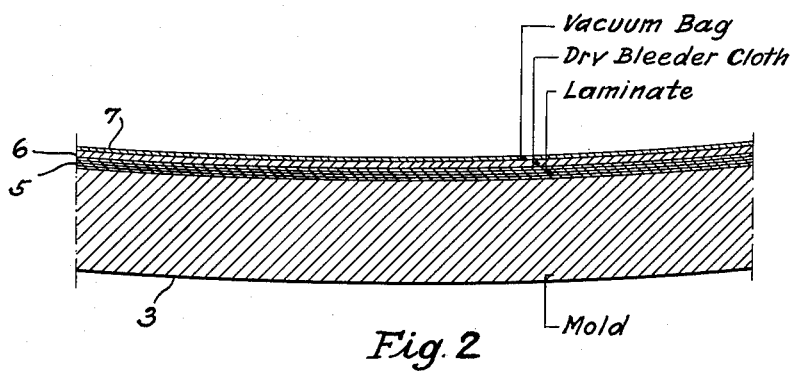

For a better understanding of the invention reference should be had to the drawing, wherein:

Fig. 1 is a cross-sectional view of a set of molds showing one embodiment of the invention, and Fig. 2, in larger scale, is a fragmentary cross-sectional view taken on line II—II of Fig. 1.

Although the invention is shown in the preferred form as a combination of a male and female mold for producing simultaneously an inner and outer laminated wall for a foamed-in article, the invention is equally applicable for each mold singly by placing the mold into a conclave under heat and pressure. Furthermore, laminations consisting of not more than three plies and using a dry bleeder cloth can be made air-free simply by evacuating the vacuum bag without applying outside pressure.

With specific reference to the form of the invention illustrated in the drawing, numeral 1 designates a male mold of multicurved shape provided with a flange 2, and 3 a corresponding female mold provided with a flange 4. The male mold 1 is nested in the female mold 3 and spaced therefrom from the female mold and being provided with a flange 4.

In operating these molds for obtaining void-free laminates 5, first, a plurality of layers of resin-impregnated fibrous material which may be glass fibre cloth containing a minimum of resin are placed, separately on each mold to form the faces of a foamed-in laminate, such as a radome. Each one of the laminates 5 is then covered with a dry bleeder cloth 6 usually having a porous or loosely woven, open-mesh construction permitting escape of gases and excess resin and of about ½ to ⅓ the thickness of the laminate, whereupon a vacuum bag 7 is placed on each one of the bleeder cloths 6 and sealed against the flanges 2 and 4, respectively, by rubber gaskets 8 and metal rings 9 which are fastened to the flanges by cap screws 10. Vacuum outlets 11 are provided for each mold and a bleeder ring 12 made of porous material near the inner flange portions along which the vacuum outlets are located. Thus prepared, vacuum is simultaneously applied to both molds after which the molds are nested and spaced from each other by a metal ring 13 provided with an air pressure inlet 14. The spacer ring 13 is sealed by gaskets 15 against the rings 9 of the molds 1 and 3 which are held together by bolts 16.

To completely remove the excess resin and all air from the laminates 5, moderate pressure of about 30 p. s. i. is admitted between the vacuum bags 7. After about 15 to 20 minutes, after which bleeding of the excess resin and all air is completed, heat is slowly added for 30 to 45 minutes to a temperature of about 150° F. By exposing the laminates to an increase in temperature to between 180° F. and 200° F. for about 2 hours curing of the laminates will be completed. After removal of the laminates from the molds the bleeder cloth is peeled off from the laminates, or sometimes the bleeder cloth may be left on the laminate if it is not objectionable. Void-free laminating by the bleeder cloth method is facilitated by the use of only a minimum of resin.

In case of combining both laminates to a foamed-in radome or other article the molds, with the laminates left therein, may be reassembled for pouring a foam core therebetween.

From the foregoing it will be understood that the invention has achieved the objects of completely removing excess resin and all air from multicurved resin-impregnated laminates without using mechanical means, but by solely applying a dry bleeder cloth to the laminate so that the excessive resin and all air from the laminate will be removed therefrom uniformly over its entire surface and with the least resistance, directly into and through the bleeder cloth, either by suction and moderate pressure or by suction only, depending on the thickness of the laminate.

While certain representative embodiments and details have been shown for the purpose of illustrating the invention, it will be apparent to those skilled in this art that various changes and modifications may be made therein without departing from the spirit or scope of the invention.

What is claimed:

1. Apparatus for simultaneously producing a pair of cup-shaped, multi-curved, resin-impregnated fabric laminates comprising a male mold member for supporting one laminate internally, a female mold member in nested relation with but spaced from the male mold member and adapted to support a second laminate externally, a separate bleeder cloth over each laminate, a separate impervious flexible cover sheet over each cloth, means spacing the mold members apart and engaging the edges of the cover sheets to provide a closed space between the cover sheets, means for introducing fluid pressure inside of the spacing means and between the cover sheets, and separate means for evacuating between each laminate and its cover sheet.

2. Apparatus for simultaneously producing a pair of cup-shaped, multi-curved, resin-impregnated fabric laminates comprising a male mold member for supporting one laminate internally, a female mold member in nested relation with but spaced from the male mold member and adapted to support a second laminate externally, a separate impervious flexible cover sheet over each laminate, means spacing the mold members apart and engaging the edges of the cover sheets to provide a closed space between the cover sheets, means for introducing fluid pressure inside of the spacing means and between the cover sheets, and separate means for evacuating between each laminate and its cover sheet.

References Cited in the file of this patent

UNITED STATES PATENTS

| | | |
|---|---|---|
| 2,054,864 | Owen | Sept. 22, 1936 |
| 2,088,352 | Vierkotter | July 27, 1937 |
| 2,276,004 | Vidal et al. | Mar. 10, 1942 |
| 2,276,035 | Guhl | Mar. 10, 1942 |
| 2,376,805 | Peacock | May 22, 1945 |
| 2,397,827 | Williams | Apr. 2, 1946 |
| 2,456,093 | Swedlow | Dec. 14, 1948 |
| 2,478,165 | Collins | Aug. 2, 1949 |